(12) United States Patent
Sakaguchi et al.

(10) Patent No.: US 6,538,062 B2
(45) Date of Patent: Mar. 25, 2003

(54) RESIN COMPOSITION FOR AQUEOUS PAINT

(75) Inventors: Shinya Sakaguchi, Naga-gun (JP); Atsushi Takamatsu, Otawara (JP); Hiroharu Sasaki, Nasu-gun (JP); Kazuyoshi Tsuneta, Nasu-gun (JP)

(73) Assignee: Dai Nippon Toryo Co., Ltd., Osaka (JP)

( * ) Notice: Subject to any disclaimer, the term of this patent is extended or adjusted under 35 U.S.C. 154(b) by 0 days.

(21) Appl. No.: 09/883,254

(22) Filed: Jun. 19, 2001

(65) Prior Publication Data

US 2002/0013405 A1 Jan. 31, 2002

(30) Foreign Application Priority Data

Jun. 20, 2000 (JP) ........................................ 2000-184253

(51) Int. Cl.$^7$ .............................................. C08L 33/00
(52) U.S. Cl. ........................ 524/833; 523/201; 523/335; 525/376; 528/363
(58) Field of Search ................................ 523/201, 335; 528/363; 525/376; 524/190, 833

(56) References Cited

U.S. PATENT DOCUMENTS

| | | | | |
|---|---|---|---|---|
| 4,083,835 A | * | 4/1978 | Pohlemann et al. | ... 260/79.5 C |
| 4,210,565 A | * | 7/1980 | Emmons | .............. 260/29.6 TA |
| 4,250,070 A | * | 2/1981 | Ley et al. | ........... 260/29.6 MM |
| 4,591,620 A | * | 5/1986 | Fogg et al. | ............... 525/328.8 |
| 4,786,676 A | * | 11/1988 | Blum et al. | .................. 524/460 |
| 4,931,494 A | * | 6/1990 | Auchter et al. | ............. 524/460 |
| 5,208,282 A | * | 5/1993 | Rehmer et al. | ............. 524/190 |
| 5,348,997 A | * | 9/1994 | Kato et al. | .................. 524/189 |
| 5,432,229 A | * | 7/1995 | Aoki et al. | .................. 524/820 |
| 5,663,241 A | * | 9/1997 | Takamatsu et al. | ....... 525/328.6 |
| 6,031,038 A | * | 2/2000 | Baumstark et al. | ......... 524/460 |
| 2002/0013405 A1 | * | 1/2002 | Sakaguchi et al. | .......... 524/833 |
| 2002/0147262 A1 | * | 10/2002 | Kriessmann et al. | ........ 524/458 |

FOREIGN PATENT DOCUMENTS

| | | | | |
|---|---|---|---|---|
| EP | 1 167 477 A1 | * | 1/2002 | ......... C09D/151/00 |
| JP | 2002-3778 A | * | 1/2002 | ......... C09D/157/10 |

OTHER PUBLICATIONS

U.S. patent application Ser. No. 09/731,721, filed Dec. 8, 2000.
U.S. patent application Ser. No. 09/883,254, filed Jun. 19, 2001, pending.

* cited by examiner

*Primary Examiner*—David W. Wu
*Assistant Examiner*—Rip Lee

(57) ABSTRACT

A resin composition for an aqueous paint, which comprises (a) a binder composed of different phase structure emulsion particles obtained by multi-stage emulsion polymerization, and (b) a compound having at least two hydrazide groups in its molecule, wherein the different phase structure emulsion particles have an outermost phase formed of an emulsion polymer which is an emulsion polymer of an ethylenic unsaturated monomer, having a glass transition temperature of from −50° C. to 15° C., and the following conditions (1) to (3) are satisfied:

(1) the emulsion polymer forming the outermost phase contains from 1 to 25 mass % of an ethylenic unsaturated monomer having a carbonyl group, (2) at least one phase located inside the outermost phase of the different phase structure emulsion particles, is formed of an emulsion polymer of an ethylenic unsaturated monomer, having a glass transition temperature of from 50° C. to 150° C., and (3) the binder has a minimum film-forming temperature of at most 30° C.

13 Claims, No Drawings

RESIN COMPOSITION FOR AQUEOUS PAINT

The present invention relates to a room temperature curable resin composition for an aqueous paint, which contains substantially no volatile organic compound (hereinafter referred to as "VOC") and which, while having a low minimum film-forming temperature (hereinafter referred to as "MFT), forms a film having an excellent anti-blocking property and being excellent in various physical properties such as water resistance, smoothness and weather resistance.

In recent years, environmental regulations have become stricter with regard to reduction of toxicity and VOC, and also from the viewpoint of saving resources, it is demanded to use water in place of an organic solvent as a solvent for a paint in the field of paint industry. As a typical paint, an aqueous emulsion paint may be mentioned which employs an aqueous emulsion resin as a binder.

However, the aqueous emulsion resin has a specific MFT, and when the temperature of the surface to be coated was lower than MFT, it was necessary to blend an organic solvent as a coalescing agent for film-formation.

On the other hand, in order to prevent blocking which is likely to occur when coated plates are piled, it is necessary to use a resin of high hardness as a binder. However, a composition employing a resin of high hardness has a high MFT, and it is again necessary to blend a coalescing agent in a large amount. Thus, even an aqueous emulsion paint contained a substantial amount of VOC, and when drying of the coated film was inadequate, there was a problem that the anti-blocking property or water resistance tended to be poor due to the remaining VOC.

Further, with respect to an aqueous emulsion paint, a study has been made on a paint having both properties of a low temperature film-forming property and an anti-blocking property. As a result, as shown in JP-A-2-175742, JP-A-7-26196, JP-A-11-349828, etc., a paint having a good anti-blocking property has been developed which comprises an emulsion resin having carbonyl groups, having a relatively low MFT, and a compound having hydrazide groups, wherein particles are crosslinked to one another to improve the anti-blocking property. However, there has been a problem that, although a certain level of an anti-blocking property can be obtained only by such crosslinking of particles, the anti-blocking property is inadequate under severe conditions.

The present invention has been made in view of such problems of the prior art, and it is an object of the present invention to provide a resin composition for an aqueous paint which is excellent in the low temperature film-forming property and which forms a coating film excellent in the anti-blocking property and in the water resistance, smoothness, weather resistance, etc., without using VOC such as coalescing agent which is likely to cause environmental pollution or bad odor, or by an addition of a small amount of VOC, if used.

In order to accomplish the above object, the present inventors have conducted an extensive study and as a result, they have found it possible to certainly accomplish the above object by the following construction and have arrived at the present invention.

Namely, the present invention provides a resin composition for an aqueous paint, which comprises (a) a binder composed of different phase structure emulsion particles obtained by multi-stage emulsion polymerization, and (b) a compound having at least two hydrazide groups in its molecule, wherein the different phase structure emulsion particles have an outermost phase formed of an emulsion polymer which is an emulsion polymer of an ethylenic unsaturated monomer, having a glass transition temperature of from −50° C. to 15° C., and the following conditions (1) to (3) are satisfied:

(1) the emulsion polymer forming the outermost phase contains from 1 to 25 mass % of an ethylenic unsaturated monomer having a carbonyl group, (2) at least one phase located inside the outermost phase of the different phase structure emulsion particles, is formed of an emulsion polymer of an ethylenic unsaturated monomer, having a glass transition temperature of from 50° C. to 150° C., and (3) the binder has a minimum film-forming temperature of at most 30° C.

Now, the present invention will be described in detail.

The binder (a) constituting the resin composition for an aqueous paint of the present invention is one composed of different phase structure emulsion particles prepared by multi-stage emulsion polymerization of an ethylenic unsaturated monomer in water.

The multi-stage emulsion polymerization is carried out by at least 2 stages, usually from 2 to 5 stages of emulsion polymerization of an ethylenic unsaturated monomer in water in accordance with a well known emulsion polymerization process, so that the emulsion polymer of an ethylenic unsaturated monomer thereby formed constitutes different phase structure emulsion particles comprising the outermost phase and one or more inner phases.

A typical example of the multi-stage emulsion polymerization process may be a process comprising a plurality of steps of repeating emulsion polymerization of an ethylenic unsaturated monomer at an elevated temperature of from 60 to 90° C. in the presence of an emulsifying agent and a polymerization initiator, and further optionally a chain transfer agent and an emulsion stabilizer.

Examples of the emulsifier include anionic surfactants, such as an aliphatic acid salt such as sodium lauryl sulfate, a higher alcohol sulfuric acid ester salt, an alkylbenzene sulfonate such as sodium dodecylbenzene sulfonate, a polyoxyethylenealkylether sulfuric acid salt, ammonium polyoxyethylenephenylether sulfonate, polyoxyethylene polyoxypropylene glycol ether sulfuric acid salt, and a so-called reactive emulsifier having a sulfonic acid group or a sulfuric ester group and a polymerizable carbon—carbon unsaturated double bond in its molecule; nonionic surfactants, such as a polyoxyethylene alkylether, polyoxynonylphenylether, a sorbitan aliphatic acid ester, a polyoxyethylene aliphatic acid ester, a polyoxyethylene-polyoxypropylene block copolymer, and a reactive nonionic surfactant having the above-mentioned group and polymerizable carbon—carbon unsaturated double bond in its molecule; cationic surfactants such as, an alkylamine salt and a quaternary ammonium salt; and (modified)polyvinyl alcohol.

Examples of the polymerization initiator include those generally used for radical polymerization, and among them, a water-soluble material is preferable. For example, persulfates such as potassium persulfate and ammonium persulfate, azo type compounds such as 2,2'-azobis(2-amidinopropane)hydrochloride, 4,4'-azobis-cyanovaleric acid and 2,2'-azobis (2-methylbutaneamidoxime) dihydrochloride tetrahydrate, and peroxides such as aqueous hydrogen peroxide and t-butylhydroperoxide, may be mentioned. Further, a redox type compound including a combination of ferrous sulfate with a reducing agent such as L-ascorbic acid and sodium thiosulfate, is also useful.

Examples of the chain transfer agent include long chain alkylmercaptans such as N-dodecylmercaptan, aromatic mercaptans and halogenated hydrocarbons.

Examples of the emulsion stabilizer include polyvinyl alcohol, hydroxyethylcellulose and polyvinylpyrrolidone.

The emulsion polymerization is carried out by a one time-charging method of charging a monomer all at once, a monomer-dropping method of continuously dropping a monomer, a preemulsion method of previously mixing and emulsifying a monomer, water and an emulsifier and dropping the emulsified product, or a combination of these methods.

According to the present invention, in the preparation of different phase structure emulsion particles as a binder in accordance with the above-mentioned methods, as an ethylenic unsaturated monomer which is added at the final stage of multi-stage emulsion polymerization and forms the outermost phase, it is necessary to use an ethylenic unsaturated monomer having a carbonyl groups in an amount of from 1 to 25 mass %, preferably from 5 to 20 mass %, of the total ethylenic unsaturated monomers to form the outermost phase, in combination with such an ethylenic unsaturated monomer as to provide an emulsion copolymer of the outermost phase having a glass transition temperature (hereinafter referred to as "Tg") of from −50° C. to 15° C., preferably from −30° C. to 10° C. Also, it is necessary to use, for at least one of inner phases, such an ethylenic unsaturated monomer as to provide an emulsion copolymer having a Tg of from 50° C. to 150° C., preferably from 55° C. to 100° C.

Also, it is necessary to use a binder having a minimum film-forming temperature (MFT) of at most 30° C., preferably at most 20° C. The lower limit of MFT may, for example, be 0° C., but the lower limit temperature is not limited to such a level.

By satisfying these conditions, it is possible to form a coating film without using or with use of only a very small amount of a VOC such as a coalescing agent, and it is possible to form a coating film excellent in the anti-blocking property or the water resistance.

In the present invention, Tg of an emulsion copolymer is one calculated in accordance with the following FOX formula.

$$1/Tg = W_1/Tg_1 + W_2/Tg_2 + \ldots + W_i/Tg_i + \ldots + W_n/Tg_n$$

(In the above FOX formula, $Tg_i(K)$ represents the glass transition temperature of a homopolymer of each monomer constituting a polymer comprising n kinds of monomers, and $W_i$ represents the mass % of each monomer, i.e. ($W_1+W_2+\ldots+W_i+\ldots W_n=1$.)

In the present invention, if Tg of the emulsion copolymer of the outermost phase of different phase structure emulsion particles is lower than −50° C., a coating film obtained therefrom tends to be poor in pollution resistance and water resistance. On the contrary, if Tg exceeds 15° C., film-formability tends to be poor at a low temperature.

Further, if MFT of the binder exceeds 30° C., film-formability tends to be poor unless a coalescing agent is used in a large amount.

Now, the ethylenic unsaturated monomer used for forming different phase structure emulsion particles will be explained.

As described above, it is necessary for the ethylenic unsaturated monomer used for an emulsion copolymer forming the outermost phase to contain an ethylenic unsaturated monomer having a carbonyl group as the essential component. Such a monomer may, for example, be acrolein, diacetone (meth)acrylamide, formylstyrol, a (meth)acryloxyalkylpropanol, diacetone (meth)acrylate, acetonyl (meth)acrylate, acetoacetoxyethyl (meth)acrylate, 2-hydroxypropyl (meth)acrylate/acetylacetate, butanediol-1,4-acrylate/acetylacrylate, vinyl ethyl ketone or vinyl isobutyl ketone.

Among them, acrolein, diacetone acrylamide or vinyl ethyl ketone is particularly preferred.

If such an ethylenic unsaturated monomer having a carbonyl group is less than 1 mass % in the total ethylenic unsaturated monomer constituting the outermost layer, no adequate crosslinking among particles can be attained, and the anti-blocking property tends to deteriorate. On the other hand, if it exceeds 25 mass %, the water resistance, etc., tend to be poor, such being undesirable.

Further, various ethylenic unsaturated monomers commonly used in the preparation of acrylic resins can be used without any restriction as comonomers copolymerizable with the ethylenic unsaturated monomer having a carbonyl group.

Typical examples of such comonomers include (meth)acrylate type monomers such as methyl (meth)acrylate, ethyl (meth)acrylate, n-propyl (meth)acrylate, isopropyl (meth)acrylate, n-butyl (meth)acrylate, isobutyl (meth)acrylate, pentyl (meth)acrylate, 2-ethylhexyl (meth)acrylate, decyl (meth)acrylate, dodecyl (meth)acrylate, stearyl (meth)acrylate, α-chloroethyl (meth)acrylate, cyclohexyl (meth)acrylate, phenyl (meth)acrylate, methoxyethyl (meth)acrylate, ethoxyethyl (meth)acrylate, methoxypropyl (meth)acrylate and ethoxypropyl (meth)acrylate; styrene type monomers such as styrene, methylstyrene, chlorostyrene and methoxystyrene; carboxyl group-containing monomers such as (meth)acrylic acid, crotonic acid, itaconic acid, itaconic acid half ester, maleic acid and maleic acid half ester; hydroxyl group-containing monomers such as 2-hydroxyethyl (meth)acrylate, 2(3)-hydroxypropyl (meth)acrylate, 4-hydroxybutyl acrylate and mono(meth)acrylic acid ester of allyl alcohol polyhydric alcohol; amide group-containing monomers such as (meth)acrylamide and maleinamide; amino group-containing monomers such as 2-aminoethyl (meth)acrylate, dimethylaminoethyl (meth)acrylate, 3-aminopropyl (meth)acrylate, 2-butylaminoethyl (meth)acrylate and vinylpyridine; epoxy group-containing monomers and oligomers obtained by reacting an active hydrogen atom-containing ethylenic unsaturated monomer with an epoxy compound having at least 2 glycidyl groups, glycidyl (meth)acrylate or allylglycidyl ether; and N-methylol acrylamide having a N-methylol group, vinyl acetate, vinyl chloride, ethylene, butadiene, acrylonitrile, and a dialkyl fumarate.

As described above, these comonomers are used optionally in such a combination as to provide an emulsion copolymer forming the outermost phase having Tg of from −50° C. to 15° C. and a binder having MFT of at most 30° C.

Further, as the ethylenic unsaturated monomer used for an emulsion copolymer forming at least one of inner phases of different phase structure emulsion particles, the same ethylenic unsaturated monomers as exemplified above can be used, but it is necessary to use them optionally in such a combination as to provide an emulsion copolymer having Tg of from 50 to 150° C. and a binder having MFT of at most 30° C.

It is particularly preferred that the emulsion copolymer of at least one of inner phases has an internal crosslinked structure, whereby MFT can be lowered without lowering the anti-blocking property.

The emulsion copolymer having an internal crosslinked structure can be produced by a method, such as a method of using a monomer having at least two polymerizable unsaturated double bonds in its molecule, such as divinylbenzene, ethylene glycol di(meth)acrylate, trimethylolpropane tri (meth)acrylate or allyl (meth)acrylate; a method of using a combination of monomers having functional groups which mutually react at a temperature during the emulsion polymerization reaction, for example, a monomer mixture selectively comprising ethylenic unsaturated monomers having a combination of functional groups, such as a carboxyl group and a glycidyl group, or a hydroxyl group and an isocyanate group; or a method of using a monomer mixture comprising silyl group-containing ethylenic unsaturated monomers, such as (meth)acryloxypropyl trimethoxysilane, (meth)acryloxypropyl triethoxysilane and (meth)acryloxypropylmethyl dimethoxysilane, which undergo a hydrolytic condensation reaction.

In the present invention, it is advisable to select and use a monomer so that MFT of the binder composed of different phase structure emulsion particles will be lower than MFT of a polymer obtainable by uniform emulsion polymerization of all monomers constituting the particles in one step.

Further, when a carboxyl group-containing monomer is used as an ethylenic unsaturated monomer, it may be neutralized with a neutralizing agent such as ammonia, dimethylethanolamine or triethanolamine.

The compound (b) having at least 2, preferably 2 or 3, hydrazide groups in its molecule, which constitutes the resin composition for an aqueous paint of the present invention, may, for example, be a carbohydrazide, oxalic acid dihydrazide, malonic acid dihydrazide, succinic acid dihydrazide, glutaric acid dihydrazide, adipic acid dihydrazide, sebacic acid dihydrazide, dodecanoic diacid dihydrazide, isophthalic acid dihydrazide, citric acid trihydrazide, 1,2,4-benzenetrihydrazide, or thiocarbodihydrazide. Among them, a carbohydrazide, adipic acid dihydrazide or succinic acid dihydrazide is preferred in view of the balance of e.g. the water resistance and the dispersibility to the emulsion.

The amount of the component (b) to be incorporated, is preferably an amount such that the hydrazide group will be from 0.1 to 2.0 equivalents, preferably from 0.3 to 1.2 equivalents, per equivalent of the carbonyl group in the emulsion copolymer forming the outermost phase in the component (a).

If the amount of the component (b) is less than the above range, the reaction with the carbonyl group in the emulsion particles (a) tends to be inadequate, whereby the antiblocking property or the coating film hardness can hardly be attainable. On the other hand, if it is excessive, an unreacted component (b) will remain, and the water resistance, etc., tend to be poor.

The resin composition for an aqueous paint of the present invention comprises a binder composed of the above-described emulsion particles and a compound having a hydrazide group. This composition may be used simply in the form of a dispersion (emulsion) in water as a clear paint, but in order to impart various functions to a paint, it is preferable to incorporate various additives, such as a dispersant, an anti-settling agent, a thickening agent, an antiseptic agent, a UV ray-absorber, a photostabilizer, and a pigment such as a extender pigment, a coloring pigment or a rust-preventing pigment.

A paint obtained in this manner is applicable to various inorganic materials, metal materials, wood materials or plastic materials, and provides an excellent coating film by air-drying or force-drying at a temperature of at most 100° C.

EXAMPLES

Now, the present invention will be described in further detail with reference to Examples. In the Examples, "part" and "%" are based on mass standard unless otherwise specified.

Examples 1 to 4 and Comparative Examples 1 to 5

200 Parts of ion-exchanged water, 1 part of sodium hydrogencarbonate (pH regulator), and 3 parts of ammonium polyoxyethylene alkylphenyl sulfate (emulsifier) "Hitenol N-08" (manufactured by Daiichi Kogyo Seiyaku K.K.) were charged into a reactor equipped with a stirrer, a thermometer, a condenser and a dropping apparatus, and heated to 80° C. while flushing the interior of the reaction with nitrogen. Then, 1 part of potassium persulfate (polymerization initiator) was added thereto, and an emulsified material (A) shown in the following Table 1 and Table 2 previously mixed by stirring in a separate container was continuously dropwise added thereto over 3 hours.

After finishing the dropwise addition of the first stage, the reaction temperature was lowered to 75° C. in 1 hour. Thereafter, an emulsified material (B) as shown in the following Tables 1 and 2 previously mixed by stirring in the same manner as in the first stage was continuously dropwise added over 4 hours. After finishing the dropwise addition, the reaction mixture was aged by continuously stirring at 75° C. for 2 hours, and the mixture was cooled to 40° C., and adjusted to pH of 9.0 with 50% dimethylethanolamine. Further, a hydrazide group-containing compound as shown in Tables 1 and 2 was added to obtain a resin composition for an aqueous paint, having different phase (two phases) structure emulsion resin particles dispersed.

Examples 5 and 6

200 Parts of ion-exchanged water, 1 part of sodium hydrogencarbonate, and 3 parts of ammonium polyoxyethylene alkylphenyl sulfate were charged into a reactor equipped with a stirrer, a thermometer, a condenser and a dropping apparatus, and heated to 80° C. while flushing the interior of the reactor with nitrogen. Then, 1 part of potassium persulfate was added thereto, and an emulsified material (A) shown in the following Table 1 and previously mixed by stirring in a separate container was continuously dropwise added thereto over 2 hours. Thereafter, an emulsified material (B) was continuously dropwise added over 2 hours. After finishing the dropwise addition of the second stage, the reaction temperature was lowered to 75° C. in 1 hour, and an emulsified material (C) as shown in Table 1 previously mixed by stirring in the same manner, was continuously dropwise added over 3 hours. After finishing the dropwise addition, the reaction mixture was aged at 75° C. for 2 hours, and the mixture was cooled to 40° C., and adjusted to pH of 9.0 with 50% dimethylethanolamine. Further, a hydrazide group-containing compound was added to obtain a resin composition for an aqueous paint having different phase (three phases) structure emulsion resin particles dispersed.

Comparative Example 6

200 Parts of ion-exchanged water, 1 part of sodium hydrogencarbonate and 3 parts of ammonium polyoxyethylene alkylphenyl sulfate were charged into a reactor equipped with a stirrer, a thermometer, a condenser and a dropping apparatus, and heated to 80° C. while flushing the interior of the reactor with nitrogen. Then, 1 part of potassium persulfate was added thereto, and an emulsified material (A) as shown in Table 2 previously mixed by stirring in a separate container was continuously dropwise added thereto over 4 hours. After finishing the dropwise addition, the reaction mixture was aged while stirring at 80° C. for 2 hours, and cooled to 40° C. Then, it was adjusted to a pH of 9.0 with dimethylethanolamine, and a hydrazide group-containing compound was further added to obtain a resin composition for an aqueous paint having uniform structure emulsion resin particles dispersed.

The abbreviations of the materials shown in Tables 1 and 2 have the following meanings. The temperature in the parentheses ( ) indicates Tg of a homopolymer of each monomer used in calculation of a glass transition temperature.

| Ethylenic unsaturated monomers | |
|---|---|
| MMA: | Methyl methacrylate (105° C.) |
| BA: | Butyl acrylate (−54° C.) |
| 2EHA: | 2-Ethylhexyl acrylate (−50° C.) |
| AA: | Acrylic acid (106° C.) |
| DVB: | Divinylbenzene (116° C.) |
| GMA: | Glycidyl methacrylate (41° C.) |
| DAAM: | Diacetone acrylamide (65° C.) |
| AAEM: | Acetoacetoxyethyl methacrylate (11° C.) |
| Hydrazide group-containing compounds | |
| ADH: | Adipic acid dihydrazide |
| CH: | Carbohydrazide |

Further, in Tg shown in Tables 1 and 2, "total (° C.)" means Tg of a polymer obtained by a single stage emulsion polymerization of a mixture of emulsified material A, emulsified material B (and emulsified material C), and "inner phase/outermost phase (° C.)" means "Tg of a polymer obtained by polymerization of emulsified material A alone/Tg of a polymer obtained by polymerization of emulsified material B alone/(Tg of a polymer obtained by polymerization of emulsified material C alone)".

Aqueous resin compositions obtained in Examples 1 to 6 and Comparative Examples 1 to 6 were subjected to each test of measuring minimum film-forming temperature (MFT), tackiness, anti-blocking property, anti-warm water whitening property, smoothness and anti-freezing property, and the results are shown at the lower parts of Tables 1 and 2.

The tests and evaluations were carried out by the following methods.

<Minimum Film-Forming Temperature (MFT)>

A resin composition for an aqueous paint was coated in a thickness of 0.2 mm by an applicator on an aluminum plate having a temperature gradient of from 0° C. to 40° C. After drying, the state of the coating film was observed, and the temperature at a boundary position where a continuous coating film was formed, was taken as MFT. However, when the boundary position was 40° C. or higher, measurements were carried out with a temperature gradient of from 40° C. to 80° C.

<Tackiness (Accelerated Pollution)>

Each resin composition for an aqueous paint was coated on a glass plate by a 6 mil applicator, and force-dried at 80° C. for 5 minutes. Then, it was cooled to room temperature, and a carbon paper was placed on the surface of the coating film thus obtained, and a weight was placed thereon to apply a load of 0.1 kg/cm$^2$ for 24 hours. Thereafter, the carbon paper was slowly peeled off, and the degree of pollution at the position where the load was applied, was visually evaluated. To one having MFT of 40° C. or higher, 2,2,4-trimethyl-1,3-pentanediol monoisobutyrate was gradually added as a coalescing agent with stirring to bring MFT to 10° C. or lower, whereupon a test plate was prepared.

Evaluation Standards

⊚: No carbon was attached.
○: Substantially no carbon was attached.
Δ: Carbon was locally attached.
X: Carbon was attached at least 50% of the part where the load was applied.

<Anti-Blocking Property>

Each resin composition for an aqueous paint was coated on a glass plate by a 6 mil applicator, and force-dried at 80° C. for 5 minutes. Then, it was cooled to 60° C., and placed on a hot plate heated at 60° C. To one having MFT of 40° C. or higher, the same coalescing agent as used in the tackiness test, was added to bring MFT to 10° C. or lower, whereupon a test plate was prepared.

Thereafter, a gauze was placed on the surface of the coating film thus obtained, and a weight heated to 60° C. was placed thereon to apply a load of 1.0 kg/cm$^2$ for 30 minutes. Then, after cooling to room temperature, the gauze was slowly peeled off, and at that time, the resistance to the peeling off and the trace of the gauze were visually evaluated.

Evaluation Standards

⊚: The gauze naturally dropped, and there was substantially no trace of the gauze on a coating film.
○: The gauze did not naturally drop, but there was substantially no trace of the gauze on a coating film.
Δ: The gauze did not naturally drop, but could be peeled off with a small force, and a trace of the gauze was slightly remained.
X: When peeling the gauze, a part of a coating film was also peeled off, and a trace of the gauze was distinctly remained.

<Anti-Warm Water Whitening Property>

Each resin composition for an aqueous paint was coated on a glass plate by a 6 mil applicator and force-dried at 80° C. for 5 minutes. Then, it was left to cool to room temperature.

Then, the glass plate having the coating film was dipped in a warm water of 50° C. for 24 hours, and the outer appearance of the coating film was visually evaluated immediately after taking out from the warm water, and the glass plate was further left to stand for 24 hours and dried at room temperature, whereupon the outer appearance of the coating film was visually evaluated.

Evaluation Standards

⊚ There was no substantial whitening of the coating film, and after drying, the coating film was completely recovered to be a clear coating film.
○: There was a slight whitening of the coating film, but after drying, the coating film was almost recovered to be a clear coating film.
Δ: There was a slight whitening of the coating film. Even after drying, slight turbidity was observed for 24 hours, and it was recovered to be a clear coating film after 48 hours.
X: The coating film was substantially whitened, and after drying, the coating film remained to be substantially whitened and could not be recovered to be a clear coating film.

<Smoothness>

Each resin composition for an aqueous paint was coated on a glass plate by a 10 mil applicator and dried on a hot plate previously heated to 80° C., whereupon "twist shrinkage" or "mud crack" was visually evaluated.

Evaluation Standards

○: Substantially no "twist shrinkage" or "mud crack" was observed, and a continuous coating film was formed.

Δ: At the edge of the coated surface, "mud crack" was slightly observed.

X: Over the entire coated surface, "mud crack" was observed, and irregularities were substantial.

<Anti-Freezing Property>

Each resin composition for an aqueous paint was coated on a slate substrate previously heated to 80° C., by a roll coater, so that the coated amount would be from about 6 to 9 g/m² and force-dried at 150° C. for 2 minutes. The substrate after drying was again coated in the same manner by a roll coater so that the coated amount would be from 6 to 9 g/m² and force-dried at 150° C. for 5 minutes. After cooling, the coated substrate was put into a freezing cycle tester, and the test was repeated 100 cycles in accordance with ASTM-B method. After the test, the outer appearance of the coating film was visually evaluated.

Evaluation Standards

○: No crack or fracture was observed.

Δ: Fine fractures not visually identifiable, were observed locally.

X: Cracks were formed over the entire surface, and they were visually identifiable.

TABLE 1

| Starting material | Ex. 1 | Ex. 2 | Ex. 3 | Ex. 4 | Ex. 5 | Ex. 6 |
|---|---|---|---|---|---|---|
| Emulsified material A | | | | | | |
| MMA | 222 | 235 | 192 | 224.5 | 148 | 123 |
| BA | 0 | 10 | 55 | 0 | 180 | 0 |
| 2EHA | 25 | 0 | 0 | 20 | 0 | 45 |
| AA | 3 | 3 | 3 | 3 | 2.7 | 2 |
| GMA | 0 | 2 | 0 | 0 | 80 | 0 |
| DVB | 0 | 0 | 0 | 2.5 | | 0 |
| Hitenol N-08 | 4 | 4 | 4 | 4 | | 2.7 |
| Water | 120 | 120 | 120 | 120 | | 80 |
| Emulsified material B | | | | | | |
| MMA | 96 | 114 | 69 | 67 | 123 | 148 |
| BA | 0 | 118 | 128 | 0 | 0 | 0 |
| 2EHA | 136 | 0 | 0 | 130 | 45 | 18 |
| AA | 3 | 3 | 3 | 3 | 2 | 2 |
| GMA | 0 | 0 | 0 | 0 | 0 | 0 |
| DVB | 0 | 0 | 0 | 0 | 0 | 2 |
| DAAM | 15 | 15 | 0 | 0 | 0 | 0 |
| AAEM | 0 | 0 | 50 | 50 | 0 | 0 |
| Hitenol N-08 | 4 | 4 | 4 | 4 | 2.7 | 2.7 |
| Water | 120 | 120 | 120 | 120 | 80 | 80 |
| Emulsified material C | | | | | | |
| MMA | | | | | 45 | 45 |
| BA | | | | | 0 | 0 |
| 2EHA | | | | | 98 | 98 |
| AA | | | | | 2 | 2 |
| DAAM | | | | | 15 | 15 |
| AAEM | | | | | 0 | 0 |
| Hitenol N-08 | | | | | 2.6 | 2.6 |
| Water | | | | | 80 | 80 |
| Dihydrazide compound | | | | | | |
| CH | 0 | 4 | 0 | 10 | 10 | 10 |
| ADH | 8 | 0 | 20 | 0 | 0 | 0 |
| Tg: Total (° C.) | 35 | 45 | 18 | 31 | 35 | 35 |
| Inner phase/outermost phase (° C.) | 80/0 | 94/7 | 53/−10 | 85/−8 | 79/46/−10 | 46/79/−10 |
| MFT (° C.) | 10 | 15 | 5≧ | 5≧ | 5≧ | 5≧ |
| Tackiness (accelerated pollution) | ○ | ◎ | ○ | ◎ | ○ | ○ |
| Anti-blocking property | ○ | ◎ | ○ | ◎ | ◎ | ◎ |
| Anti-warm water whitening property | ◎ | ◎ | ○ | ◎ | ◎ | ◎ |
| Smoothness | ○ | ○ | ○ | ○ | ○ | ○ |
| Anti-freezing property | ○ | ○ | ○ | ○ | ○ | ○ |

TABLE 2

| Starting material | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Emulsified material A (Inner phase) | | | | | | |
| MMA | 222 | 222 | 222 | 204 | 100 | 318 |
| BA | 0 | 0 | 0 | 11 | 147 | 0 |
| 2EHA | 25 | 25 | 25 | 0 | 0 | 161 |
| AA | 3 | 3 | 3 | 3 | 3 | 6 |
| GMA | 0 | 0 | 0 | 0 | 0 | 15 |
| DVB | 0 | 0 | 0 | 2 | 0 | 0 |
| DAAM | 0 | 0 | 0 | 30 | 0 | 0 |
| Hitenol N-08 | 4 | 4 | 4 | 4 | 4 | 8 |
| Water | 120 | 120 | 120 | 120 | 120 | 240 |
| Emulsified material B (Outermost phase) | | | | | | |
| MMA | 96 | 110 | 20 | 107 | 212 | |
| BA | 0 | 0 | 0 | 140 | 15 | |
| 2EHA | 136 | 137 | 117 | 0 | 0 | |
| AA | 3 | 3 | 3 | 3 | 3 | |
| DAEM | 15 | 0 | 110 | 0 | 0 | |
| AAEM | 0 | 0 | 0 | 0 | 20 | |
| Hitenol N-08 | 4 | 4 | 4 | 4 | 4 | |
| Water | 120 | 120 | 120 | 120 | 120 | |
| Dihydrazide compound | | | | | | |
| CH | 0 | 0 | 25 | 0 | 4 | 0 |
| ADH | 0 | 8 | 0 | 12 | 0 | 8 |
| Tg: Total (° C.) | 35 | 36 | 36 | 35 | 30 | 34 |
| Inner phase/outermost phase (° C.) | 80/0 | 80/1 | 80/1 | 88/−4 | −8/80 | |
| MFT (° C.) | 10 | 15 | 10 | 10 | ≧80 | 55 |
| Tackiness (accelerated pollution) | Δ | Δ | ○ | Δ | ○ | Δ |
| Anti-blocking property | Δ | Δ | ○ | Δ | Δ | X |

TABLE 2-continued

| Starting material | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Anti-warm water whitening property | ◯ | ◯ | X | Δ | ◯ | Δ |
| Smoothness | ◯ | X | Δ | X | X | X |
| Anti-freezing property | ◯ | ◯ | Δ | ◯ | Δ | X |

As evident from the above Table 1, the compositions of Examples 1 to 6 had excellent coating film properties without containing VOC.

On the other hand, the composition of Comparative Example 1 having no hydrazide group-containing compound incorporated, was poor in the anti-blocking property, etc. Further, the composition of Comparative Example 2 employing no carbonyl group-containing monomer was poor in the anti-blocking property, smoothness, etc. Further, the composition of Comparative Example 3 having a carbonyl group-containing monomer co-polymerized excessively, was poor in the anti-warm water whitening property, smoothness and anti-freezing property. Further, the composition of Comparative Example 4 wherein the emulsion co-polymer forming the outermost phase contained no carbonyl group, was poor in the anti-blocking property, smoothness, anti-warm water whitening property, etc. Further, the composition of Comparative Example 5 wherein Tg of the emulsion co-polymer forming the outermost phase exceeded 15° C. and Tg of the emulsion co-polymer forming the inner phase was lower than 50° C., required a large amount of a coalescing agent, and was poor in the smoothness, anti-freezing property, etc. Further, the composition of Comparative Example 6 using a single phase of emulsion particles and using no carbonyl group-containing monomer, was poor in the anti-blocking property, smoothness, anti-freezing property, etc.

The resin composition for an aqueous paint of the present invention contains substantially no VOC, whereby environmental pollution or bad odor can be avoided, and it forms a coating film having excellent anti-blocking property while having low MFT and further being excellent in water resistance, smoothness, etc.

What is claimed is:

1. A resin composition for an aqueous paint, which comprises (a) a binder comprising different phase structure emulsion particles obtained by a multi-stage emulsion polymerization, and (b) a compound having at least two hydrazide groups in its molecule, wherein the different phase structure emulsion particles comprise an outermost phase formed of an emulsion polymer of an ethylenically unsaturated monomer, having a glass transition temperature of from −50° C. to 15° C., and the following conditions (1) to (3) are satisfied:
    (1) the emulsion polymer forming the outermost phase comprises from 1 to 25 mass % of an ethylenically unsaturated monomer having a carbonyl group,
    (2) at least one phase disposed inside the outermost phase of the different phase structure emulsion particles, and comprising an emulsion polymer of an ethylenically unsaturated monomer, having a glass transition temperature of from 50° C. to 150° C. and
    (3) the binder has a minimum film-forming temperature of at most 30° C.

2. The resin composition for an aqueous paint according to claim 1, wherein the hydrazide group equivalent in the component (b) is from 0.1 to 2.0 equivalents per equivalent of the carbonyl group in the emulsion polymer forming the outermost phase of component (a).

3. The resin composition for an aqueous paint according to claim 1, wherein said at least one phase disposed inside the outermost phase of the different phase structure emulsion particles of the component (a), comprises an emulsion polymer of an ethylenically unsaturated monomer having an internal cross-linked structure.

4. A resin composition of claim 1, wherein the emulsion polymer forming the outermost phase comprises 5 to 20 mass % of an ethylenic unsaturated monomer having a carbonyl group, based on the total amount of ethylenically unsaturated monomers forming the outermost phase.

5. The resin composition of claim 1, wherein the binder has a minimum film-forming temperature of at most 20° C.

6. The resin composition of claim 1, wherein the binder has a minimum film-forming temperature of at least 0° C.

7. The resin composition of claim 1, wherein the ethylenically unsaturated monomer having a carbonyl group is selected from the group consisting of acrolein, diacetone (meth)acrylamide, formylstyrol, (meth)acryloxyalkylpropanol, diacetone (meth)acrylate, acetonyl (meth)acrylate, acetoacetoxyethyl (meth)acrylate, 2-hydroxypropyl (meth)acrylate/acetylacetate, butanediol-1,4-acrylate/acetylacrylate, vinyl ethyl ketone, and vinyl isobutyl ketone.

8. The resin composition of claim 7, wherein the ethylenically unsaturated monomer is selected from the group consisting of acrolein, diacetone acrylamide, and vinyl ethyl ketone.

9. The resin composition of claim 1, wherein the ethylenically unsaturated monomer having a carbonyl group is copolymerized with a co-monomer selected from the group consisting of (meth)acrylate esters, styrene, substituted styrene, (meth)acrylic acid, crotonic acid, itaconic acid, itaconic acid half esters, maleic acid, maleic acid half esters, hydroxyalkyl (meth)acrylates, (meth)acrylamides, maleinamides, aminoalkyl (meth)acrylates, vinylpyridine, glycidyl (meth)acrylate esters, N-methyol acrylamides, vinyl acetate, vinyl chloride, ethylene, butadiene, acrylonitrile, and dialkylfumarates.

10. The resin composition of claim 3, wherein the internal cross-linked structure is formed by polymerizing an ethylenically unsaturated monomer having at least two polymerizable unsaturated double bonds.

11. The resin composition of claim 10, wherein the ethylenically unsaturated monomer having at least two polymerizable unsaturated double bonds is selected from the group consisting of divinylbenzene, ethylene glycol di(meth)acrylate, trimethylol propane tri(meth) acrylate, and allyl (meth)acrylate.

12. The resin composition of claim 1, wherein the compound having at least two hydrazide groups is selected from the group consisting of a carbohydrazide, oxalic acid dihydrazide, malonic acid dihydrazide, succinic acid dihydrazide, glutaric acid dihydrazide, adipic acid dihydrazide, sebacic acid dihydrazide, dodecanoic diacid dihydrazide, isophthalic acid dihydrazide, citric acid trihydrazide, 1,2,4-benzenetrihydrazide, and thiocarbodihydrazide.

13. The resin composition of claim 2, wherein the hydrazide group equivalent in component (b) is from 0.3 to 1.2 equivalents.

\* \* \* \* \*